United States Patent
Kang et al.

(10) Patent No.: US 7,646,683 B2
(45) Date of Patent: Jan. 12, 2010

(54) ADJUSTMENT OF REGIONAL CODE INFORMATION

(75) Inventors: Woo Sig Kang, Pyeongtaek-si (KR); Oh Ill Kwon, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 401 days.

(21) Appl. No.: 11/755,391

(22) Filed: May 30, 2007

(65) Prior Publication Data
US 2008/0043604 A1 Feb. 21, 2008

(30) Foreign Application Priority Data
Jun. 27, 2006 (KR) .................. 10-2006-0057848
Jun. 27, 2006 (KR) .................. 10-2006-0057859

(51) Int. Cl.
*G11B 7/09* (2006.01)
(52) U.S. Cl. .................................. 369/47.1; 369/59.1
(58) Field of Classification Search .................. None
See application file for complete search history.

(56) References Cited

U.S. PATENT DOCUMENTS

| 2003/0190148 A1* | 10/2003 | Lee ........................... 386/70 |
| 2005/0123267 A1* | 6/2005 | Tsumagari et al. ............ 386/46 |
| 2006/0262710 A1* | 11/2006 | Shim et al. ............... 369/275.1 |

* cited by examiner

*Primary Examiner*—Muhammad N. Edun
(74) *Attorney, Agent, or Firm*—Fish & Richardson P.C.

(57) ABSTRACT

The adjustment of regional code information in which a first region code and a first nation code associated with the first region code are received from an optical disc. At least one of a broadcasting signal or an IP address are received at an electronic device, such as a DVD player. A second nation code is extracted from the broadcasting signal and/or the IP address, and a second region code associated with the second nation code is determined. The second region code is compared with the first region code, and the second region code and the second nation code are stored at the device if the first region code and the second region code do not match.

13 Claims, 4 Drawing Sheets

ADJUSTMENT OF REGIONAL CODE INFORMATION

CROSS-REFERENCE TO RELATED APPLICATION

This application claims priority to Korea Patent Application No. 10-2006-0057848, filed on Jun. 27, 2006, and Korea Patent Application No. 10-2006-0057859, filed on Jun. 27, 2006, which are incorporated herein by reference.

BACKGROUND

1. Field

The present disclosure relates to the adjustment of regional code information, and one particular implementation relates to automatically detecting and setting region code and nation code information in digital versatile disc ("DVD") recording devices, based upon a broadcasting signal or an internet protocol ("IP") address.

2. Description of the Related Art

DVDs, which are lightweight yet which store several hours of high quality movie and music data, have become increasingly popular due to their ability to record and play data without a corresponding degradation in reproduction quality. The abundance of inexpensive DVD devices, such as DVD players and DVD recorders, makes DVDs particularly attractive as a storage medium for movies, music, and other data-rich applications.

The world-wide use of DVDs, in conjunction with improvements in DVD devices, has led to an increase in piracy of copyrighted music and movies. In response, major film companies have implemented a DVD regional coding system which dictates that commercially-available DVD players may only play DVDs encoded with a particular region code. This provision allows motion picture companies to control various aspects of a movie release, such as DVD content, release date, and price, on a region-by-region basis.

Although region coding is beneficial to motion picture companies, it also creates inconveniences for those who travel between regions. For example, a traveler may move between two countries with distinct DVD region codes, such as from South Asia (Region Code 4) to the United States (Region Code 1). If the traveler takes their Region Code 4 DVD player with them, they will be restricted from playing local Region Code 1 DVDs because the region code of the DVD player does not match the region code of the local DVDs. Similarly, Region Code 4 DVDs legitimately purchased by the traveler in their home country will not be playable in a Region 1 DVD player at the destination.

Region codes are normally set by manufacturers, and may not be reset by end-users. Accordingly, if the user is unable to obtain service from a particular manufacturer at the destination, they may be unable play legitimately purchased DVDs on a local DVD device, and DVDs purchased while abroad may not be reproduced on their home DVD device.

SUMMARY

According to one general aspect, a first region code and a first nation code associated with the first region code are received from an optical disc. At least one of a broadcasting signal or an IP address are received at an electronic device, such as a DVD player. A second nation code is extracted from the broadcasting signal and/or the IP address, and a second region code associated with the second nation code is determined. The second region code is compared with the first region code, and the second region code and the second nation code are stored at the device if the first region code and the second region code do not match.

Implementations may include one or more of the following features. For example, the device may compare the second nation code extracted from the broadcasting signal with the second nation code extracted from the IP address, where the second region code and the second nation code are stored if the first region code and the second region do not match and the second nation code extracted from the broadcasting signal and the second nation code extracted from the IP address match. An authorization request including the first region code and a second region code may be transmitted, an authorization approval message or an authorization denial message may be received in response to the authorization request, and the second region code and second nation code may be stored if the first region code and the second code do not match, and if an authorization approval message is received. System information data may be stored with the second nation code if the first region code and the second region code do not match, where the system information data may include a display format code, a language code, or a parental lock code. The new region code or the new nation code may be displayed, a user input may be accepted, and the predefined region code and the predefined nation code may be changed based upon the user input. The second nation code may be extracted from twenty-third through twenty-sixth characters of a video program system code of the broadcasting signal.

According to another general implementation, a first nation code is received from an optical disc, and the first nation code is stored. At least one of a broadcasting signal or an IP address are received, and a second nation code is extracted from the broadcasting signal and/or the IP address. The second nation code is compared with the first nation code, and the second nation code is stored if the first nation code and the second nation code do not match.

According to another general implementation, a device includes an optical pickup configured to receive a first region code and a first nation code associated with the first region code from an optical disc. The device also includes a memory configured to store the first region code and the first nation code, and an interface configured to receive at least one of a broadcasting signal or an IP address, and to store the second region code and the second nation code if the first region code and the second region code do not match. Furthermore, the device includes a microcomputer configured to extract the second nation code from the broadcasting signal and/or the IP address, to determine a second region code associated with the second nation code, and to compare the second region code with the first region code. The interface may be a tuner or an internet interface.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1:
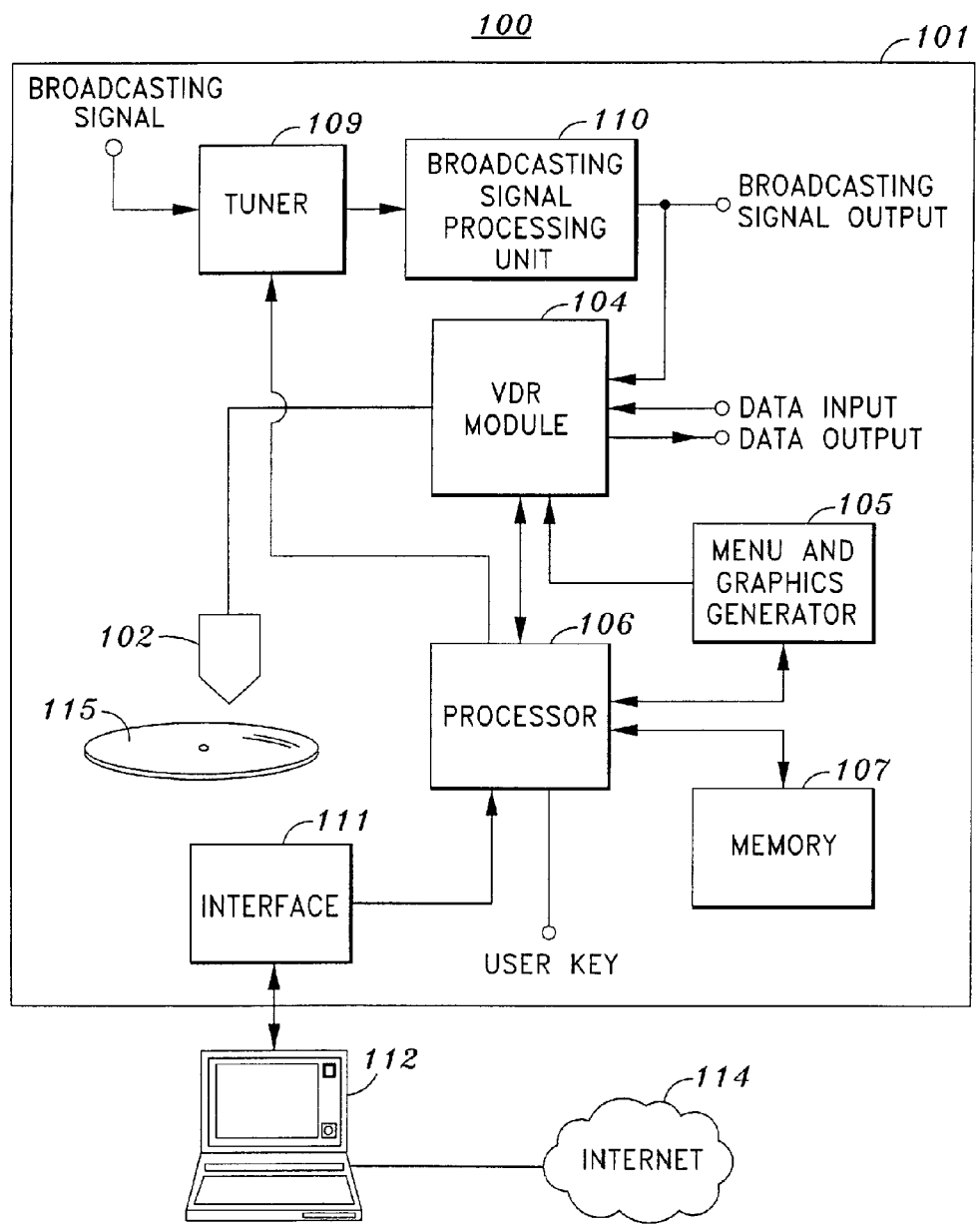
FIG. 1 is a block diagram of a system including an exemplary DVD device according to one general implementation.

FIG. 1 illustrates a system 100, including an exemplary DVD device 101, a computer 110 and the Internet 114. The DVD device 101 which may be a DVD player or a DVD recorder, includes an optical reader 102, a Video Data Recording ("VDR") module 104, a menu and graphics generator 105, a processor 106, a memory 107, a tuner 109, and a broadcasting signal processing unit 110. Additionally, the DVD device 101 further includes a timer (not depicted) and an interface 111 for connecting the DVD device 101 with an external computer 110, which is connected to the Internet 114. The interface 111 may be a universal serial bus ("USB") port, a local area network (LAN) port, or another type of interface.

The DVD device 101 stores a region code corresponding to the geographical region in which the DVD device 101 is located, where the region code is preset by the manufacturer of the DVD device 101. Other system information data, such as a nation code, a default language, a display format, or local parental lock settings, are also stored in memory 107. The DVD device 101 also includes functionality designed to block the playback or reproduction of a DVD, when the stored region code does not match the region code associated with a DVD 115.

Figure 2:
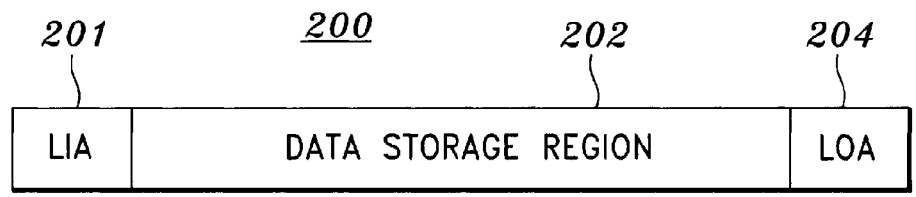
FIG. 2 depicts the organization of data on a DVD.

FIG. 2 depicts the organization of data on a DVD 200. The DVD 200 includes a lead-in area ("LIA") 201, a data storage region 202, and a lead-out area ("LOA") 204. DVD system information data, such as the region code associated with the DVD, an index of available audio tracks or languages, and an index of available subtitle languages, is stored in the LIA 201. The data storage region 202 stores an MPEG-2 program stream with recorded video and/or audio data, multi-language audio data, and multi-language subtitle data. The LOA 204 stores other system or content information.

Table 1 lists example region codes and associated geographic regions, which may be stored in LIA 201.

TABLE 1

Region Codes and Associated Geographic Regions

| REGION CODE | GEOGRAPHIC REGION |
|---|---|
| 1 | Bermuda, Canada, United States and U.S. territories |
| 2 | The Middle East, Western Europe, Central Europe, Egypt, French overseas territories, Greenland, Japan, Lesotho, South Africa, and Swaziland |
| 3 | Southeast Asia, Hong Kong, Macau, South Korea, and Taiwan |
| 4 | Central America, the Caribbean, Mexico, Oceania, South America |
| 5 | The rest of Africa, former Soviet Union, the Indian subcontinent, Mongolia, North Korea |
| 6 | Mainland China |
| 7 | Reserved for future use |
| 8 | International venues, such as aircraft, cruise ships, etc. |

In operation, DVD device 101 reads the LIA 201 of the inserted DVD 200 to determine the region code associated with the DVD 200, and determines whether the region code associated with the DVD 200 matches with the region code stored in the DVD device 101. For example, if the DVD device 101 is located in South Korea and stores Region Code 3, a DVD storing Region Code 2 will not be playable or recordable, since the region codes do not match.

In order to avoid inconveniencing a legitimate user, the DVD device 101 may automatically set or reset its locally-stored region code based on data available to the DVD device 101 from a computer network or a broadcast signal. More specifically, the DVD device 101 may determine its approximate national and/or geographic location based upon a computer network or broadcast signal, and set its region code and other system information data based on the geographic region in which the DVD device 101 is determined to be located.

Figure 3:
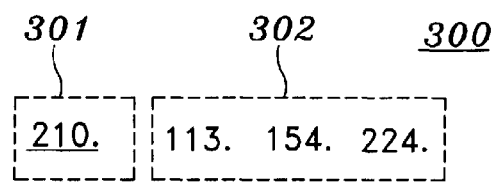
FIG. 3 depicts an exemplary IP address that is used for determining a location of a DVD device.

FIG. 3 illustrates an exemplary IP address 300 that is used for determining a location of the DVD device 101. The DVD device 101 obtains the local IP address 300 when it is connected to the computer 112 via interface 111, where the computer 112 in turn obtains an IP address by connecting to the Internet 114. Alternatively, the DVD device 101 obtains the local IP address 300 by directly connecting to the Internet 114 via the interface 111.

As shown in FIG. 3, an IP address may be formatted as a 32-bit numeric address, written as four sets of numbers separated by periods. The first set 301 identifies a network, and the second through fourth sets 302 uniquely identify the DVD device 101 itself. For example, the local IP address 300 reads "210.113.154.224," which includes a first set 301 which reads "210," and second through fourth sets 302 which read "113.154.224."

Since the first set 301 is assigned by an Internet Service Provider ("ISP"), that portion of the IP address may be used to determine the geographic region in which the DVD device 101 is located, based upon the geographic region in which the ISP is located. Once the network is identified, the ISP corresponding to that network may be determined, and then the geographic region corresponding to the ISP may also be determined by referencing a database.

Figure 4:
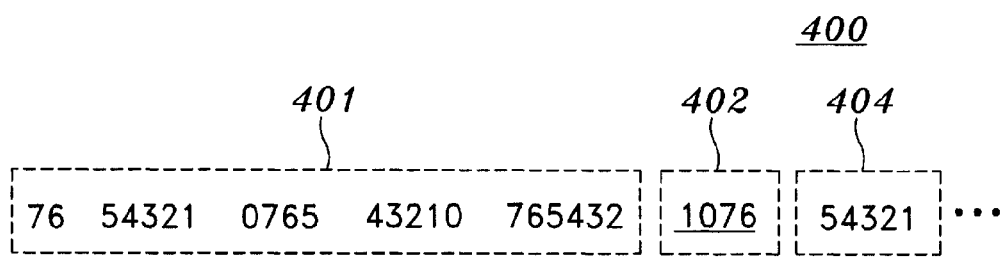
FIG. 4 depicts an exemplary broadcast signal that is used for determining a location of a DVD device.

Similarly, a broadcast signal can also be used to determine the geographic region in which the DVD device 101 is located, where the DVD device 101 obtains the local broadcasting signal 400 using the tuner 109. FIG. 4 illustrates an exemplary broadcast signal 400 that is used for determining a location of the DVD device 101. The broadcasting signal includes a video program system ("VPS") code transmitted during the vertical blanking interval ("VBI"), where the VPS code includes at least seven sets of numbers. The first through fifth sets 401 identify the broadcast address, day, month, hour and minute, respectively, the sixth set 402 identifies the broadcast nation, and the seventh set 404 identifies a program source. In FIG. 4, the nation code is obtained by querying a database for the numbers in the sixth set 402, which reads "1076", where the sixth set 402 may be extracted from the twenty-third through twenty-sixth digits of the VPS signal.

Figure 5:
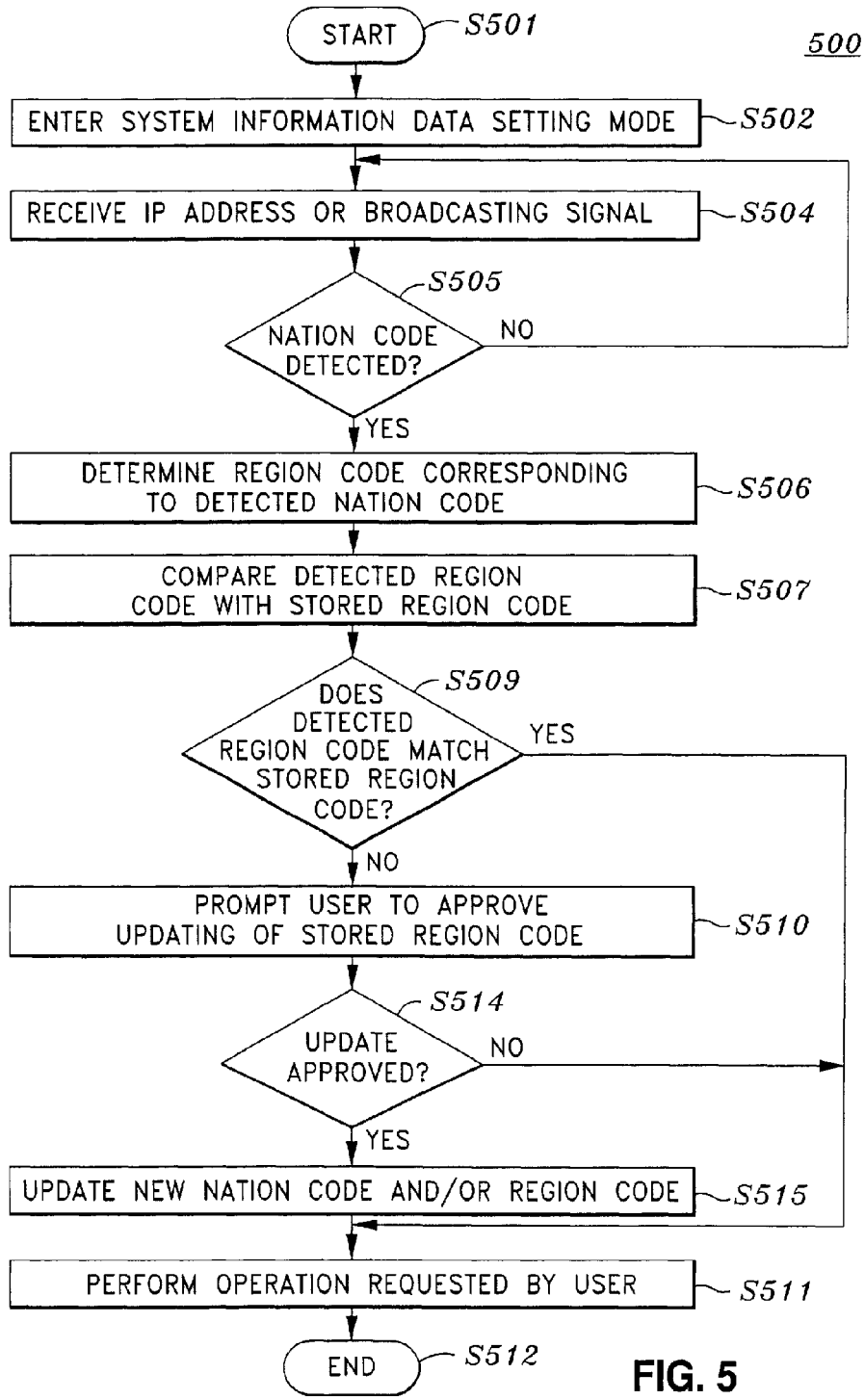
FIGS. 5 and 6 are flowcharts depicting exemplary methods for setting the system information data of a DVD device.

FIG. 5 is a flowchart depicting an exemplary method 500 for setting the system information data of the DVD device 101. The method 500 begins (S501), and the DVD device 101 enters into a system information data setting mode (S502). In alternate implementations, the processor 106 may enter into the system information data setting mode when a user inputs a request to enter the system information data setting mode, when the DVD device 101 connects to the computer 112, when a broadcasting signal is tuned via tuner 109, or upon the occurrence of another event.

The DVD device 101 receives an IP address or a broadcasting signal (S504), such as via interface 111 or tuner 116. The DVD device 101 determines whether a nation code is detected in the received IP address or the received broadcast signal (S505). If the nation code is detected (S505), the DVD device 101 determines the region code corresponding to the detected nation code via a database, table, or other approach (S506). For example, if the nation code is indicative that the DVD player 101 is located in South Korea, the region code corresponding to the detected nation will be determined as Region Code 3. If the nation code is not detected (S505), another IP address or broadcasting signal is received (S504).

Once the region code has been detected, the DVD device 101 compares the detected region code with a region code currently stored in memory (S507). For example, if the detected region code is Region Code 1 and the region code stored in the memory 107 of the DVD device 101 is Region Code 2, the DVD device 101 will determine that the currently-stored region code is no longer indicative of the current location of the DVD device 101.

If it is determined that two region codes no longer match (S509), the DVD device 101 prompts a user to approve the updating of the region code stored in the memory 107 of the DVD device 101 (S510). In one implementation, the DVD device 101 displays the detected nation code and associated region code, and prompts the user to approve the updating of the region code and/or the nation code using a menu generated via the menu and graphics generator 105. In another implementation, the DVD device 101 does not prompt the user to approve the updating, and instead automatically performs the update without any user input, or performs the update at a predetermined time or date. If it is determined that the two region codes match (S509), an operation requested by the user, such as a playback or reproduction operation, is performed (S511), and method 500 ends (S512).

If the user requests or approves an update of the stored nation code and/or region code (S514), the DVD device 101 replaces the stored nation and/or region code with the detected nation code or the determined region code (S515), the operation requested by the user is performed (S511), and method 500 ends (S512). If the user does not approve the update (S514), the operation requested by the user is performed (S511) without updating the nation and/or region code. In certain implementations, a mechanism is provided for permitting the user to reset the nation and region codes to their original values in the event that the user approves an update to the codes. For example, the codes may be reset upon loss of power to the device.

Furthermore, and in addition to the nation code and/or the region code, the DVD device 101 may automatically change other information stored in the memory 107 to conform to the detected location, such as a display format code, a language code, and a parental lock code, or other location-related information. For example, if the DVD device is moved from South Korea to France, and in addition to changing the region code from Region Code 3 to Region Code 2, the display format code may be changed from the National Television Systems Committee ("NTSC") television encoding system to the phase-alternating line ("PAL") television encoding system, the language code will be changed from a Korean language code to a French language code, and the parental lock code will be changed to a code that satisfies French parental lock rules.

Table 2 indicates an example of the categories and types of system information data which may be stored in the memory 107 of the DVD device 101. The system information data may include, for example a region code, a nation code, a display format or encoding system code, a language code, and/or a parental lock code for each nation associated with a region code.

TABLE 2

Example System Information Data

| Region Code | Nation | Display Format | Language | Parental Lock |
|---|---|---|---|---|
| 1 | USA | NTSC | English | |
| | Canada | | | |
| | Mexico | | Spanish | |
| | ... | | | |
| 2 | England | PAL | English | |
| | France | | French | |
| | ... | | ... | |
| | Japan | NTSC | Japanese | |
| 3 | South Korea | NTSC | Korean | |
| | ... | | ... | |
| ... | ... | ... | ... | |
| 6 | China | PAL | Chinese | |

As shown in Table 2, the stored system information data may be organized by region. For example, Region Code 1 (generally corresponding to North America) is stored in association with the nation codes and languages of the United States of America, Canada, and Mexico. Similarly, the nation code for South Korea, associated with the Region Code 3, is stored in association with an NTSC television encoding system and a Korean language code. Likewise, the nation code for Japan, associated with Region Code 2, is stored in association with the NTSC television encoding system, the Japanese language code. Furthermore, the nation code for China, associated with Region Code 6, is stored in association with the PAL television encoding system, and the Chinese language code.

Parental lock codes, which are utilized to protect children or teenagers from inappropriate content, may also be organized by regions. Thus, if parental lock provisions are identical in South Korea, Japan, and China, the parental lock codes associated with those nation codes may be the same or similar. On the other hand, if parental lock provisions are different for South Korea, Japan and China, the parental lock codes associated with the nation codes of South Korea, Japan, and China may have different codes.

Figure 6:
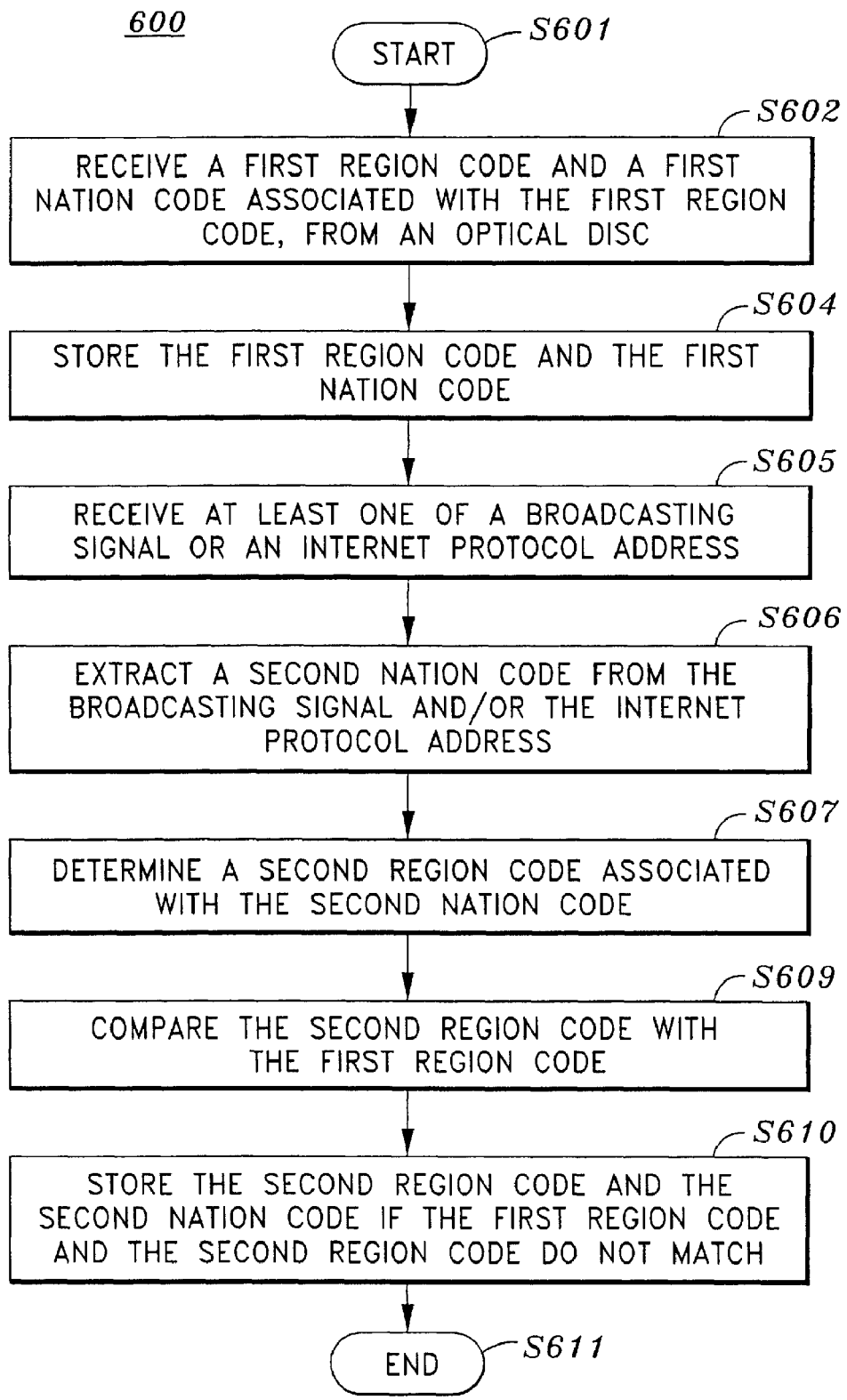

FIG. 6 is a flowchart depicting a method 600 for setting the system information data of a DVD device. The method 600 begins (S601), and the DVD device receives a first region code and a first nation code associated with the first region code, from an optical disc (S602). The device stores the first region code and the first nation code (S604), such as in a memory, although in an alternate implementation the first region code and/or the first nation code are not stored.

The DVD device receives at least one of a broadcasting signal or an IP address (S605), and extracts a second nation code from the broadcasting signal and/or the IP address (S606). The second nation code may be extracted from a network part of the IP address, or from the VPS code of the broadcasting signal. In one example implementation, the second nation code is extracted from the twenty-third through twenty-sixth characters of the VPS code.

The DVD device determines a second region code associated with the second nation code (S607), and compares the second region code with the first region code (S609), where the first and second region codes are DVD region codes. If the first region code and the second region code do not match, the device stores the second region code and the second nation code (S610), and the method 600 ends (S611).

The device may also compare the second nation code extracted from the broadcasting signal with the second nation code extracted from the IP address, wherein the second region code and the second nation code are stored if the first region code and the second region do not match and the second nation code extracted from the broadcasting signal and the second nation code extracted from the IP address match. Additionally, the device may transmit an authorization request including the first region code and a second region code, receive an authorization approval message or an authorization denial message in response to the authorization request, and store the second region code and second nation code if the first region code and the second code do not match, and if an authorization approval message is received.

The device may store system information data associated with the second nation code, if the first region code and the second region code do not match, where the system information data may include a display format code, a language code, or a parental lock code. The device may also display the new region code or the new nation code, accept a user input, and change the predefined region code and the predefined nation code, based upon the user input.

According to another general implementation, a device includes an optical pickup configured to receive a first region code and a first nation code associated with the first region code, from an optical disc. The device also includes a memory configured to store the first region code and the first nation code, and an interface configured to receive at least one of a broadcasting signal or an IP address, and to store the second region code and the second nation code if the first region code and the second region code do not match. Furthermore, the device includes a microcomputer configured to extract the second nation code from the broadcasting signal and/or the IP address, to determine a second region code associated with the second nation code, and to compare the second region code with the first region code. The interface may be a tuner or an internet interface.

It is understood that various modifications may be made without departing from the spirit and scope of the claims. Thus, advantageous results still could be achieved if steps of the disclosed techniques were performed in a different order and/or if components in the disclosed systems were combined in a different manner and/or replaced or supplemented by other components.

The arrangements have been described with particular illustrative embodiments. It is to be understood that the concepts and implementations are not however limited to the above-described embodiments and that various changes and modifications may be made.

What is claimed is:

1. A method comprising:
   receiving a first region code and a first nation code associated with the first region code, from an optical disc;
   receiving at least one of a broadcasting signal or an internet protocol address;
   extracting a second nation code from the broadcasting signal and/or the internet protocol address;
   determining a second region code associated with the second nation code;
   comparing the second region code with the first region code; and
   storing the second region code and the second nation code if the first region code and the second region code do not match.

2. The method of claim 1, further comprising storing system information data associated with the second nation code if the first region code and the second region code do not match.

3. The method of claim 2, wherein the system information data further comprises a display format code, a language code, or a parental lock code.

4. The method of claim 1, wherein the first and second region codes are digital versatile disc regional codes.

5. The method of claim 1, wherein the second nation code is extracted from a network part of the internet protocol address.

6. The method of claim 1, wherein the second nation code is extracted from a twenty-third through twenty-sixth characters of a video program system code of the broadcasting signal.

7. The method of claim 1, further comprising:
   displaying the new region code or the new nation code;
   accepting a user input; and
   changing the predefined region code and the predefined nation code, based upon the user input.

8. The method of claim 1, further comprising comparing the second nation code extracted from the broadcasting signal with the second nation code extracted from the internet protocol address, wherein the second region code and the second nation code are stored if the first region code and the second region do not match and the second nation code extracted from the broadcasting signal and the second nation code extracted from the internet protocol address match.

9. The method of claim 1, further comprising
   transmitting an authorization request, the authorization request including the first region code and a second region code; and
   receiving an authorization approval message or an authorization denial message in response to the authorization request;
   wherein the second region code and second nation code are stored if the first region code and the second code do not match, and if an authorization approval message is received.

10. The method of claim 1, further comprising storing the first region code and the first nation code.

11. A method comprising:
    receiving a first nation code from an optical disc;
    storing the first nation code;
    receiving at least one of a broadcasting signal or an internet protocol address;
    extracting the second nation code from the broadcasting signal and/or the internet protocol address;
    comparing the second nation code with the first nation code; and
    storing the second nation code if the first nation code and the second nation code do not match.

12. The device according to claim 11, wherein the interface is a tuner or an internet interface.

13. A device comprising:
    an optical pickup configured to receive a first region code and a first nation code associated with the first region code, from an optical disc;
    a memory configured to store the first region code and the first nation code;
    an interface configured to receive at least one of a broadcasting signal or an internet protocol address, and to store the second region code and the second nation code if the first region code and the second region code do not match;
    a microcomputer configured to extract the second nation code from the broadcasting signal and/or the internet protocol address, to determine a second region code associated with the second nation code, and to compare the second region code with the first region code.

* * * * *